No. 790,504. Patented May 23, 1905.

UNITED STATES PATENT OFFICE.

GEORGE FRANÇOIS JAUBERT, OF PARIS, FRANCE.

PRODUCTION OF OXYGEN FROM HYPOCHLORITES.

SPECIFICATION forming part of Letters Patent No. 790,504, dated May 23, 1905.

Original application filed August 11, 1903, Serial No. 169,077. Divided and this application filed December 7, 1903. Serial No. 184,105.

*To all whom it may concern:*

Be it known that I, GEORGE FRANÇOIS JAUBERT, a citizen of the Republic of Switzerland, residing at Paris, France, have invented certain new and useful Improvements in the Production of Oxygen from Hypochlorites, of which the following is a specification.

My invention has relation to a method whereby the hypochlorites (bleaching-chlorids) may be decomposed for the liberation of oxygen adapted for commercial use, and in such connection it relates more particularly to the steps constituting such a method, whereby, with the use of catalytic agents, a small proportion of chlorid of cobalt may enter into a reaction with a bleaching-chlorid to decompose said bleaching-chlorid, if desired, instantaneously and secure the tumultuous production or liberation of oxygen at a relatively low temperature, whereof an application for a patent for the claimed subject-matter was filed by me under date of August 11, 1903, Serial No. 169,077, and from which the present application was divided out and made Division A thereof.

It has been heretofore known that oxygen may be produced or liberated from chlorid of lime by adding thereto in relatively large quantities a chlorid of cobalt. In all previous treatment of the chlorid of lime, however, the mixture of the chlorids to a temperature of 80° was requisite, and then the decomposition was gradual, with a slow liberation of oxygen. By reason of the slowness of such a process, as well as the expense entailed in the use of large quantities of cobalt, the production of oxygen from such a decomposition of the chlorids was commercially impracticable. Again, where solutions of hypochlorites were used in this former process and heated to a temperature of about 80° to enable reaction to take place the hypochlorites were readily converted into chlorates, with a diminution in the liberation of oxygen. The oxygen gas liberated was also impure, containing an appreciable quantity of chlorin and oxygenated compounds of chlorin. In the carrying out of my present method all these defects are eliminated, and oxygen may be liberated almost instantaneously and in volume and purity sufficient to render the method commercially practicable, and the chlorid mixture need not be heated, but, on the contrary, is decomposed at a relatively low temperature. To secure these advantages, the chlorid of lime as a hypochlorite solution is mixed with a solution of a catalytic agent or agents in the cold in either of the following ways: First, for example, one hundred parts of chlorid of lime are mixed in an ordinary manner and in a suitable vessel with one hundred parts of cold water. The mixture is allowed to settle, and the clear liquid is then decanted into a gas-generating apparatus. There is then added to the clear liquid, without stirring, eight parts of crystallized chlorid of cobalt (an energetic catalytic agent) dissolved in a small quantity of cold water. A tumultuous disengagement or liberation of oxygen from the solutions then takes place, and in a short interval (five minutes or less) all the hypochlorite is decomposed. Should two parts only of the chlorid-of-cobalt solution be added, then the complete decomposition of the hypochlorite will take place in from one to two hours. In either instance the method is commercially and industrially practicable. In this example the active catalytic agent (chlorid of cobalt) may be replaced wholly or in part by less active catalytic agents—such, for instance, as the soluble or insoluble salts of iron, manganese, nickel, cobalt, or lead—either in conjunction with the chlorid of cobalt or in conjunction with a special catalytic or carrying agent of appreciable little decomposing power when used alone, but which in combination with the soluble salts above enumerated renders their catalytic power much more active. Such a special catalytic agent is, for instance, sulfate of copper. Second, for example, sixty parts of dry chlorid of lime are mixed with three hundred and fifty parts of water. The milky mixture is then poured into the gas-generating apparatus, and there is then added, with agitation, twelve parts of sulfate of iron (or manganese) and three parts of sulfate of copper dissolved in fifty parts of water. Oxygen will at once be disengaged, and its liberation will be hastened by an occasional agitation of the mixture and terminates in less than one hour. It is to be understood that neither of the sulfates alone (manganese, iron, or copper) would have caused an appreciable decomposition of the hypochlorite in the cold even after acting for twenty-four hours. The combination, however, of two or more relatively feeble catalytic agents enhances the catalytic or decomposing action upon the hypochlorite in the cold sufficiently to secure in time and quantity the results obtained heretofore only by the use of a very active catalytic agent (chlorid of cobalt) at a high temperature. Third, when desired the materials, such as chlorid of lime and the mixture of catalytic agents, (sulfate or iron, copper, &c.,) may be combined in a dry state and used thereafter by dropping into water the mixture in granulated, agglomerated, powdered, or pastil form. In this instance one hundred kilos of dry chlorid of lime are pulverized with fifteen kilos of dry sulfate of iron and five kilos of dry sulfate of copper. The dry powder thus obtained may thereafter, if desired, be formed into globules or pastils and will generate oxygen by merely dropping the powder in any of its forms into water.

Having thus described the nature and object of my invention, what I claim as new, and desire to secure by Letters Patent, is—

1. In the production of oxygen from hypochlorites, a catalytic or decomposing agent, consisting of a salt of a metal with sulfate of copper.

2. In the production of oxygen from hypochlorites, a catalytic or decomposing agent, consisting of a mixture of a salt of a metal of the iron group with sulfate of copper.

3. In the production of oxygen from hypochlorites, a catalytic or decomposing agent, consisting of a mixture of sulfate of a metal of the iron group with sulfate of copper.

4. In the production of oxygen from hypochlorites, a catalytic or decomposing agent, consisting of a mixture of sulfate of iron with sulfate of copper.

5. In the production of oxygen from hypochlorites, a catalytic or decomposing agent, consisting of a mixture of sulfate of manganese combined with sulfate of copper.

In testimony whereof I have hereunto set my signature in the presence of two subscribing witnesses.

GEORGE FRANÇOIS JAUBERT.

Witnesses:
PAUL DE MOSTRAL,
H. C. COXE.